US012789997B2

(12) United States Patent
Kammerer et al.

(10) Patent No.: US 12,789,997 B2
(45) Date of Patent: Nov. 10, 2026

(54) LUGGAGE COMPARTMENT FOR AN AIRCRAFT

(71) Applicant: FACC AG, Ried im Innkreis (AT)

(72) Inventors: Bernhard Kammerer, Zell an der Pram (AT); Matús Docolomansky, Svätý Jur (SK)

(73) Assignee: FACC AG, Ried Im Innkreis (AT)

( * ) Notice: Subject to any disclaimer, the term of this patent is extended or adjusted under 35 U.S.C. 154(b) by 0 days.

(21) Appl. No.: 19/155,047

(22) PCT Filed: Mar. 4, 2024

(86) PCT No.: PCT/AT2024/060080
§ 371 (c)(1),
(2) Date: Aug. 8, 2025

(87) PCT Pub. No.: WO2024/182829
PCT Pub. Date: Sep. 12, 2024

(65) Prior Publication Data

US 2026/0225718 A1 Aug. 6, 2026

(30) Foreign Application Priority Data

Mar. 3, 2023 (AT) .............................. A 50161/2023

(51) Int. Cl.
*B64D 11/00* (2006.01)

(52) U.S. Cl.
CPC .................................. *B64D 11/003* (2013.01)

(58) Field of Classification Search
CPC ................................ B64C 1/14; B64D 11/003
USPC ...................................................... 244/118.1
See application file for complete search history.

(56) References Cited

U.S. PATENT DOCUMENTS 5,456,529 A * 10/1995 Cheung ................ B64D 11/003 74/89.21
8,038,098 B2 10/2011 Johnson et al.
2026/0070657 A1* 3/2026 Kammerer ........... B64D 11/003

FOREIGN PATENT DOCUMENTS

| | | | | | |
|---|---|---|---|---|---|
| AT | 526607 | A4 * | 5/2024 | ........... | B64C 11/003 |
| CN | 119790005 | A * | 4/2025 | ........... | B64D 11/003 |
| DE | 4425869 | A1 * | 2/1996 | ........... | B64D 11/003 |
| DE | 4425869 | C2 * | 5/1996 | ........... | B64D 11/003 |
| DE | 19617657 | A1 * | 11/1997 | ........... | B64D 11/003 |

(Continued)

OTHER PUBLICATIONS

ISA European Patent Office, International Search Report Issued in Application No. PCT/AT2024/060080, Apr. 24, 2024, WIPO, 4 pages.

*Primary Examiner* — Christopher P Ellis
(74) *Attorney, Agent, or Firm* — McCoy Russell LLP

(57) ABSTRACT

A luggage compartment for an aircraft, comprising: a luggage compartment housing, a bucket with a bottom and two side walls for receiving a piece of luggage, a hinge defining a pivot axis between the luggage compartment housing and the bucket, wherein the bucket can be lowered by pivoting about the hinge from a raised storage position into a lowered loading position, a cover element, which in the storage position of the bucket closes a loading opening of the bucket and in the loading position releases the loading opening of the bucket, wherein the cover element is movable from a closing position closing the loading opening into an opening position releasing the loading opening when the bucket is lowered from the storage position into the loading position.

20 Claims, 5 Drawing Sheets

(56) References Cited

FOREIGN PATENT DOCUMENTS

| | | | | | |
|---|---|---|---|---|---|
| DE | 69422425 | T2 | | 5/2000 | |
| DE | 102007059686 | A1 | | 6/2009 | |
| DE | 102010034025 | A1 | | 2/2012 | |
| DE | 102017206444 | A1 | * | 10/2018 | ........... B64D 11/003 |
| DE | 102010034025 | B4 | * | 2/2022 | ........... B64D 11/003 |
| FR | 2936465 | A1 | * | 4/2010 | ............... B60R 7/04 |
| WO | WO-9943545 | A1 | * | 9/1999 | ........... B64D 11/003 |
| WO | WO-2005028255 | A1 | * | 3/2005 | ............... B60R 7/06 |
| WO | 2014117198 | A1 | | 8/2014 | |
| WO | WO-2024182829 | A1 | * | 9/2024 | ........... B64D 11/003 |

* cited by examiner

LUGGAGE COMPARTMENT FOR AN AIRCRAFT

CROSS REFERENCE TO RELATED APPLICATIONS

The present application is a U.S. National Phase of International Application No. PCT/AT2024/060080 entitled "LUGGAGE COMPARTMENT FOR AN AIRCRAFT", and filed on Mar. 4, 2024. International Application No. PCT/AT2024/060080 claims priority to Austrian Patent Application No. A 50161/2023 filed on Mar. 3, 2023. The entire contents of each of the above-listed applications are hereby incorporated by reference for all purposes.

TECHNICAL FIELD

The invention relates to a luggage compartment, in particular an overhead luggage compartment, for an aircraft, comprising:

- a luggage compartment housing,
- a bucket with a bottom and two side walls for receiving a piece of luggage,
- an hinge between the luggage compartment housing and the bucket, wherein the bucket can be transferred from a storage position into a loading position by pivoting about the stationary pivot axis formed by the hinge,
- a cover element, which in the storage position of the bucket closes a loading opening of the bucket and in the loading position releases the loading opening of the bucket.

BACKGROUND AND SUMMARY

The invention further relates to an aircraft with such a luggage compartment, in particular an overhead luggage compartment.

As described in WO 2014/117198, overhead luggage compartments for aircrafts (so-called "bins") are known in various embodiments. In one embodiment, a fixed box is provided, which is loaded with the pieces of luggage. The box is closed with a door, which is pivoted upwards for loading or unloading. This type of luggage compartment is also referred to as "shelf bin" or "fixed bin". The advantage of these luggage compartments lies not only in their simple design, but also in the comparatively low closing forces that have to be applied to close the door. A disadvantage of the "fixed bins", however, is that the front edge of the upwardly pivoted door is difficult to reach for users with a smaller body size. This problem is alleviated by another embodiment of overhead luggage compartments in which a bucket is provided which can be pivoted about a stationary pivot axis, so that the front part of the bucket is lowered by the pivoting about the stationary pivot axis in order to be able to place the hand luggage into the bucket. These luggage compartments are referred to as "pivot bins". In the closed condition, the loading opening at the front of the bucket is covered by a fixed housing. After releasing a latching device, often referred to as a "latch", the bucket is lowered into the opening position. In the prior art, the bucket must be pivoted over a comparatively large pivot angle for loading and unloading. In order that the user has to apply as little force as possible to close the bucket, the pivot axis between the bucket and the housing can be arranged in the horizontal direction near the common center of gravity of the bucket and the piece of luggage. However, this further increases the pivot angle when the bucket is opened. The disadvantage of these embodiments is that the bucket is lowered relatively far forwards when in an open condition. This obstructs access to the seats below the luggage compartment if the loading process has not yet been completed when the luggage compartment is open.

Another embodiment of overhead luggage compartments is described in U.S. Pat. No. 8,038,098 B2. The BEA luggage compartment has an upper door and a lower door, each of which is movable between a closing and an opening position. Essentially, the luggage compartment comprises a bottom which has a first section adjacent to the rear wall and a second section adjacent to the lower door. The first (rear) section is immovably disposed. When the lower door is pivoted downward, the second (front) section of the floor panel rotates downward relative to the first (rear) section to define a ramp. Thus, this prior art relates to an adapted "fixed bin" with the aim of lowering the height for access to the interior of the luggage compartment. However, this embodiment has the disadvantage that a complicated mechanism is required, which also assumes a "fixed bin".

Another different embodiment of overhead luggage compartments is "articulated bins", in which the bucket is moved downwards diagonally for loading and unloading. Examples of such articulated bins are shown in DE4425869A1 and DE69422425T2. Since, in this embodiment, the bucket is not rotated about a pivot axis as in the pivot bins, but is lowered and raised as a whole, the loaded weight must disadvantageously be lifted into the closing position. The lever ratios of the pivoted bins cannot be used.

The articulated bin of DE4425869A1 does provide a sealing flap, which is pivoted upwards when the receiving space is lowered. However, the sealing flap requires a complex actuating mechanism, which is neither intended nor suitable for use with pivot bins. Additionally, in DE4425869A1 the sealing flap is opened, which comprises an actuating handle for this purpose, and the lowering of the receiving space is released when the sealing flap is opened. With pivoted bins, it's the other way around.

Also in the articulated bin of the DE69422425T2, the lowering of a bucket is associated with the upward pivoting of a gate hatch. However, this mechanism as well is designed only for an articulated bin and would not be transferable to a pivot bin, in which the bucket is pivoted about a fixed hinge axis as described above. In addition, the gate hatch of the DE69422425T2 is attached to the lower end of the front wall of the retaining structure. Therefore, the DE69422425T2 neither offers a solution to the disadvantages of conventional pivot bins.

In contrast, the object of the present invention is to alleviate or even eliminate the disadvantages of the known "pivot bins". The object of the invention is preferably to provide a luggage compartment with a pivotable bucket which, in the open condition, facilitates access to the seats below the luggage compartment.

This object is achieved with a luggage compartment and with an aircraft each having the features described herein.

According to the invention, when pivoting the bucket from the storage position to the loading position, the cover element is movable, in particular liftable, from a closing position closing the loading opening to an opening position releasing the loading opening.

With the known "pivot bins", the front part of the bucket had to be lowered completely under the fixed front of the luggage compartment housing in order to allow access to the interior of the bucket. This required a comparatively large pivot angle of the bucket, especially if the centre of rotation of the bucket is close to the centre of gravity for a forcesaving embodiment. In contrast, the cover element of the embodiment according to the invention is not arranged in a stationary manner, but is movable relative to the bucket and the luggage compartment housing. If the bucket is transferred from the raised storage position into the lowered loading position by pivoting about the pivot axis, which is stationary during this time, the cover element can be brought into the opening position, in particular simultaneously with the lowering of the bucket, as a result of which the loading opening on the front side of the bucket facing the user is released. Advantageously, the front part of the bucket of the embodiment according to the invention must be lowered to a lesser extent during pivoting into the loading position compared to the prior art, because the cover element can be actively moved away from the loading opening. For this purpose, the cover element can be raised in particular contrary to the lowering movement of the front part of the bucket when it is pivoted. With a comparatively small pivot angle of the bucket, the luggage compartment can advantageously be designed for large pieces of hand luggage, which in particular can also be placed standing upright next to one another in the bucket. In the loading position of the luggage compartment according to the invention, a large passage height is created below the luggage compartment, which makes it easier for passengers to take their seats while the loading process of the luggage compartment has not yet been completed. Due to the small closing angle of the embodiment according to the invention, the effort required to close the bucket can also be reduced.

For purposes of this disclosure, the location and direction indications, such as "horizontal," "vertical," "up," "down," refer to the intended assembly condition of the luggage compartment in an aircraft cabin with the aircraft oriented horizontally. "Front" refers to the side of the luggage compartment facing the user; "rear" refers to the side of the luggage compartment facing away from the user.

The bucket encloses a receiving space for pieces of luggage. For this purpose, the bucket comprises a bottom for positioning the piece of luggage and two side walls at the longitudinal ends of the bottom that laterally delimit the receiving space, which extends in particular in the longitudinal direction of the aircraft fuselage when assembled or in use. The side walls stand up from the bottom transversely to the longitudinal direction of the bottom, i.e. in particular substantially vertically. Preferably, the bucket also comprises an upper wall delimiting the receiving space at the top and a rear wall delimiting the receiving space at the rear. A loading opening is formed on the front side of the bucket in order to be able to arrange the piece of luggage in the receiving space. Preferably, the loading opening is framed by the front edges of the bottom, the side walls, and the upper wall. This makes it easy to avoid overloading in the loading position. Furthermore, the bucket may comprise a bottom base reinforcing the bottom below the bottom. The bucket is connected to the luggage compartment housing via the hinge for forming the stationary pivot axis, which is arranged fixedly, i.e. immovably, in the aircraft cabin when the bucket is opened.

The luggage compartment housing may comprise two side parts, which may extend substantially parallel to the side walls of the bucket. In addition, the luggage compartment housing can comprise an upper and rear part and a front part. Preferably, one hinge each is provided between one of the side walls of the bucket and one of the side parts of the luggage compartment housing. The hinges define a pivot axis, preferably extending in the longitudinal direction of the aircraft fuselage, about which the bucket is pivoted from the closing position into the completely lowered opening position. Thus, during the transfer from the closing position to the opening position and vice versa, the bucket performs a pure pivoting movement about the pivot axis. Unlike the "articulated bins", the bucket is not moved downwards as a whole for transfer into the opening position.

The luggage compartment preferably comprises a latching device between the bucket and the luggage compartment housing. In the latched condition of the latching device, the bucket is held in the storage position. In the unlatched condition of the latching device, the pivoting of the bucket from the storage position into the loading position is released. A triggering device, in particular a handle, can be provided for transferring the latching device from the latched into the unlatched condition. The handle is preferably provided on the bucket, preferably on the bottom side of the bucket.

The cover element is preferably formed by a covering panel, preferably with a substantially constant wall thickness.

In order to minimise obstruction to access to seats below the luggage compartment, it is advantageous if the bucket is pivoted by means of the hinge in the lowered loading position by a pivot angle selected from a range of 10° to 30°, in particular from 15° to 25°, relative to the storage position. As a result, the luggage compartment can comprise a smaller pivot angle compared to conventional "pivoted bins", which means that the passage height below the luggage compartment is not restricted by a great extent. This makes it easier for passengers to access the seats at the beginning of a flight, while the luggage compartments are typically still arranged in the loading position.

For the reasons mentioned above, it is also advantageous if a, preferably substantially flat, mounting surface on the top side of the bottom of the bucket in the loading position is arranged at an angle of +5° to −15°, in particular 0° to −10°, to the horizontal. In contrast, the bottom surface of a conventional "pivoted bins" is much more inclined forward in the loading position, which can make access to the seats below such luggage compartments difficult.

In a particularly preferred embodiment, a coupling device acts between the bucket and the cover element, which is designed to move the cover element from the closing position to the opening position when the bucket is lowered from the storage position to the loading position. Thus, the coupling device is in each case connected to the bucket and the cover element in such a way that the cover element is moved from the closing position into the opening position independently, i.e. without the intervention of the operator, when the bucket is lowered from the storage position into the loading position. The coupling device therefore couples the movement of the cover element to the lowering of the luggage compartment. Conversely, the cover element is automatically brought into the closing position by means of the coupling device when the bucket is lifted from the loading position into the storage position. In order to release the loading opening on the front side of the bucket facing the user, it is therefore only necessary to lower the bucket into the loading position; the cover element is pressed into the opening position by means of the coupling device.

In order to couple the movement of the cover element to the movement of the bucket, in a preferred embodiment, the coupling device comprises a link or slotted guide, with which the lowering of the bucket from the storage position into the loading position is transmitted into the movement of the cover element from the closing position into the opening position.

The slotted guide preferably comprises a link slot and a link block. The link block is displaceable in the longitudinal direction of the link slot, but is received laterally, i.e. in the direction perpendicular to the longitudinal direction of the link slot, substantially free of play in the link slot. Depending on the embodiment, the link slot may be straight or curved. The link slot or the link block is connected to the cover element, whereas the link block or the link slot is connected to the bucket. When the bucket is lowered from the storage position into the loading position, the link block moves in a first direction along the link slot, a first moment being transmitted to the cover element, which causes the movement of the cover element from the closing position into the opening position. When the bucket is lifted from the loading position to the storage position, the link block moves in a second direction opposite to the first direction along the link slot, whereby a second movement opposite to the first movement is transmitted to the cover element, which causes the cover element to move from the opening position to the closing position.

In an alternative embodiment, the coupling device comprises a first and a second coupling element, which are linearly displaceable in a common link. The first coupling element may be articulated to the cover element. The second coupling element may be articulated to the bucket, preferably to the side wall of the bucket. This coupling device is also designed to bring the cover element into the opening position by lowering the bucket from the storage position into the loading position and to bring it into the closing position by lifting the bucket from the loading position into the storage position.

In a preferred embodiment, in order to move the cover element from the closing to the opening position and vice versa, the cover element is attached to at least one pivot arm, preferably to two pivot arms at opposite longitudinal ends of the cover element. Preferably, each pivot arm is pivotably mounted on one of the side parts of the luggage compartment housing. The pivot arm preferably comprises a flat part, which is arranged substantially parallel to the side wall of the bucket. This ensures that the limited installation space in the longitudinal direction of the aircraft fuselage is used optimally. The hinge axis of the pivot arm preferably extends substantially parallel to and at a distance from the hinge axis, about which the bucket can be pivoted between the storage and loading position.

In a preferred embodiment, the cover element is guided from the closing to the opening position (and vice versa) along a circular arc-shaped movement path. This embodiment has the advantage, in particular, that the cover element is less far forward in the opening position compared to the upwardly pivotable door of “fixed bins”. This prevents unintentional contact between the cover element and the passenger.

In a preferred embodiment, during the transition from the closing to the opening position (or vice versa from the opening to the closing position), the cover element is guided adjacent to and preferably substantially parallel to an inner side of the front part or the upper part of the luggage compartment housing. In a preferred embodiment, the cover element is curved, wherein the radius of curvature of the cover element substantially corresponds to the radius of movement of the cover element during pivoting between the closing and the opening position.

In a preferred embodiment, the cover element is arranged at least partially, preferably substantially completely, above a lower edge of a front part of the luggage compartment housing in the opening position in order to at least partially, preferably substantially completely, expose the loading opening at the front of the bucket. Thus, in the opening position, the cover element can be at least partially, preferably substantially completely, hidden in the luggage compartment housing.

In a further embodiment, the cover element is mounted, in particular suspended, on a front part of the luggage compartment housing. In this embodiment, the cover element is also preferably connected to the bucket via a coupling device, so that the cover element is automatically transferred from the closing position to the opening position, in particular raised, when the bucket is lowered, and is automatically transferred from the opening position to the closing position, in particular lowered, when the bucket is raised.

Preferably, in the previously described embodiment, it is favorable for the cover element to comprise first and second covering panel elements, wherein the first and second covering panel elements are articulated to one another, wherein the first and second covering panel elements are arranged in an unfolded condition in the closing position and in a folded condition in the opening position.

In order to reduce the force exerted by the user when lifting the bucket, it is advantageous if the bucket comprises an engagement point with an engagement surface for a user, in particular a handle strip with a handle strip surface extending along the bucket, for pivoting the bucket from the loading position into the storage position, wherein, in the loading position of the bucket, a tangent of the circular arc-shaped movement path of the bucket through the engagement surface is arranged at an angle of 60° to 120°, preferably at an angle of 80° to 100°, to the engagement surface. This embodiment has the advantage that the intuitive lifting of the bucket upwards at the engagement surface substantially corresponds to the movement path of the bucket, whereby the force exerted by the user is minimized.

The invention is explained in more detail below with reference to exemplary embodiments illustrated in the drawings.

DETAILED DESCRIPTION

Figure 1:
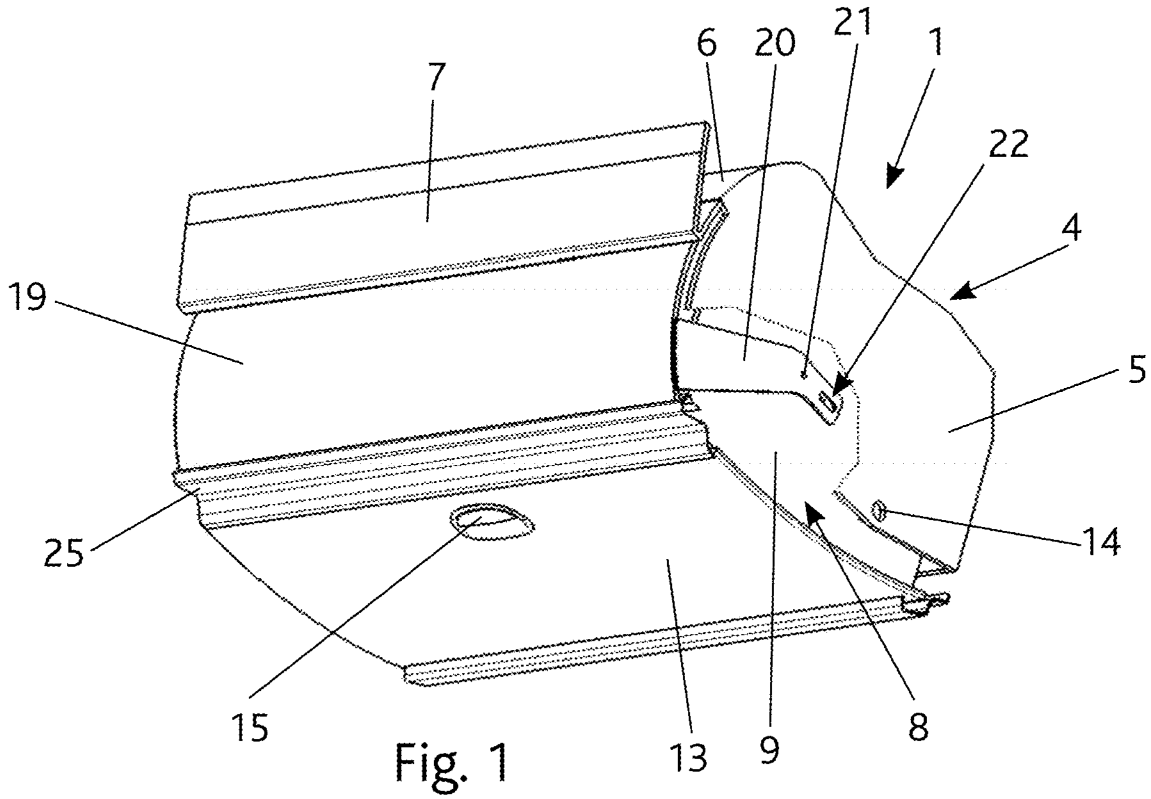
FIGS. 1 to 4 show an embodiment of an overhead luggage compartment according to the invention, in which a bucket is lowered and a cover element is raised to release a loading opening.

FIGS. 1 to 4 show an embodiment of an overhead luggage compartment 1 that is installed in an aircraft cabin 2 (shown in FIG. 9) of an aircraft 3. The overhead luggage compartment 1 comprises a luggage compartment housing 4 which is open at the bottom and has two opposite, vertically arranged side parts 5, an upper and rear part 6 and a front part 7. The luggage compartment housing 4 is arranged stationary, i.e. immovably on the aircraft fuselage when the luggage compartment 1 is opened. A bucket 8, which is open to the front, is pivotably arranged on the luggage compartment housing 4. The bucket 8 comprises two side walls 9, a bottom 10, an upper wall 11, a rear wall 12, and a bottom base 13 that reinforces the bottom 10 below the bottom 10. For the pivotable arrangement of the bucket 8, uniaxial hinges 14 are provided between the side walls 9 of the bucket 8 and the side parts 5 of the luggage compartment housing 4. The hinges 14 define a horizontal pivot axis about which the bucket 8 is pivotable from a storage position shown in FIG. 1 and FIG. 3 to a loading position shown in FIG. 2 and FIG. 4, and vice versa. The spatial position of the pivot axis does not change during the transfer from the storage position to the loading position. Thus, the bucket 8 performs a pure rotational movement between the storage position and the loading position. In the loading position, a front loading opening 16 of the bucket 8 is released, so that a piece of luggage 17 (cf. FIG. 9) can be inserted into a receiving space 18 of the bucket 8 delimited by the side walls 9, the bottom 10, the upper wall 11 and the rear wall 12 (or removed from the receiving space 18 accordingly). In the storage position, the front loading opening 16 of the luggage compartment 1 is closed by a cover element 19, which is explained in more detail below.

Figure 6:
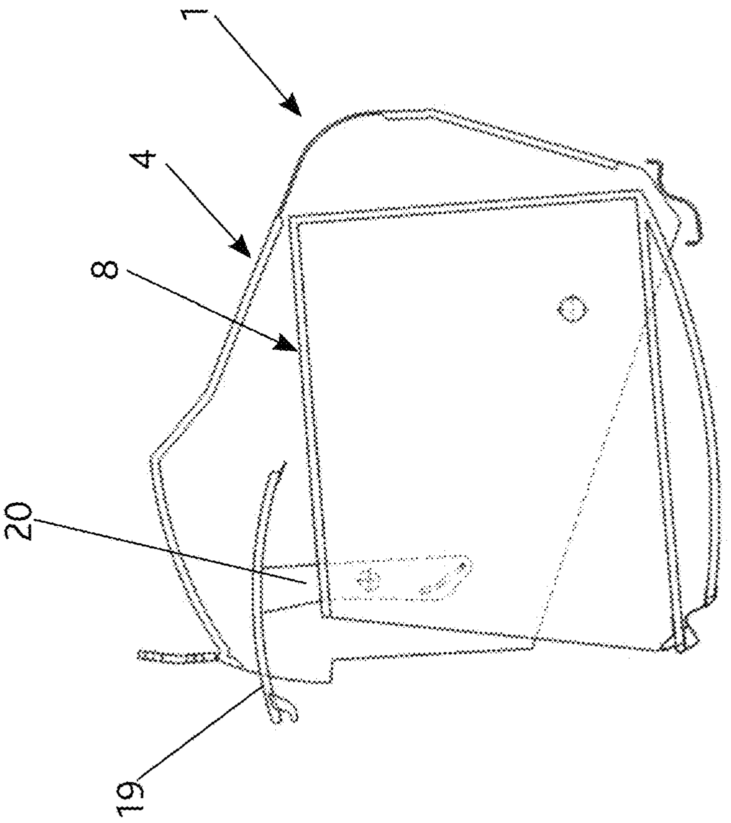
FIG. 5 and FIG. 6 show a variant of the overhead luggage compartment shown in FIGS. 1 to 4.
Figure 5:
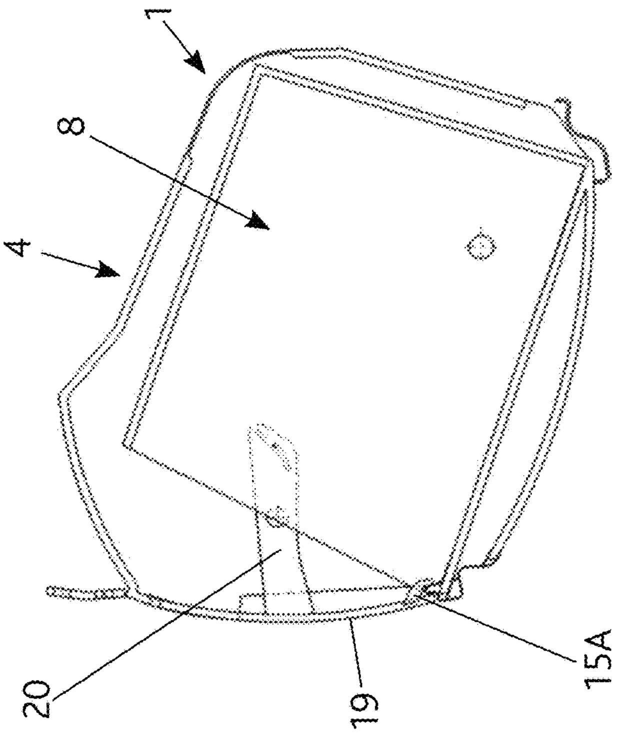

The luggage compartment 1 comprises a latching device acting between the bucket 8 and the luggage compartment housing 2, for example with a latching lug 15A visible in FIG. 5 and FIG. 6. In the latched condition of the latching device, the bucket 8 is held in the storage position. In the unlatched condition of the latching device, the pivoting of the bucket 8 from the storage position into the loading position is released. A triggering device, in this case a handle 15, can be provided on the bucket 8 to transfer the latching device from the latched to the unlatched condition.

In the embodiment shown, the cover element 19 is movable relative to the bucket 8 and the luggage compartment housing 4 between a closing position closing the loading opening 16 and an opening position releasing the loading opening 16. For this purpose, two pivot arms 20 are provided, which at their free ends carry the cover element 19, which in the embodiment shown is designed as a curved covering panel. The pivot arms 20 are mounted on the side parts 5 of the luggage compartment housing 4 so as to be pivotable about hinge axes 21. By pivoting the cover element 19 relative to the bucket 8, the loading opening 16 can be opened or closed. When the pivot arms 20 are pivoted between the closing and opening positions of the cover element 19, the cover element 19 is guided along an circular arc-shaped movement path, which in the exemplary embodiment of FIGS. 1 to 4 runs adjacent to an inner side of the front part 7 and the front section of the upper and rear parts 6 of the luggage compartment housing 4. In the opening position, the cover element 19 is located completely above a lower edge of the front part 7 of the luggage compartment housing 4.

In the exemplary embodiments shown, a coupling device 22 is also provided, by means of which the cover element 19 is simultaneously brought into the opening position by lowering the bucket 8 or into the closing position at the same time by raising the bucket 8.

In the exemplary embodiment of FIGS. 1 to 4, the coupling device 22 is connected to the side wall of the bucket 8 and to the pivot arm 20, respectively. The coupling device 22 comprises a slotted guide 23 with a link slot 24A on the pivot arm 20 and a link block 24B on the side wall 9 of the bucket 8.

Figure 2:
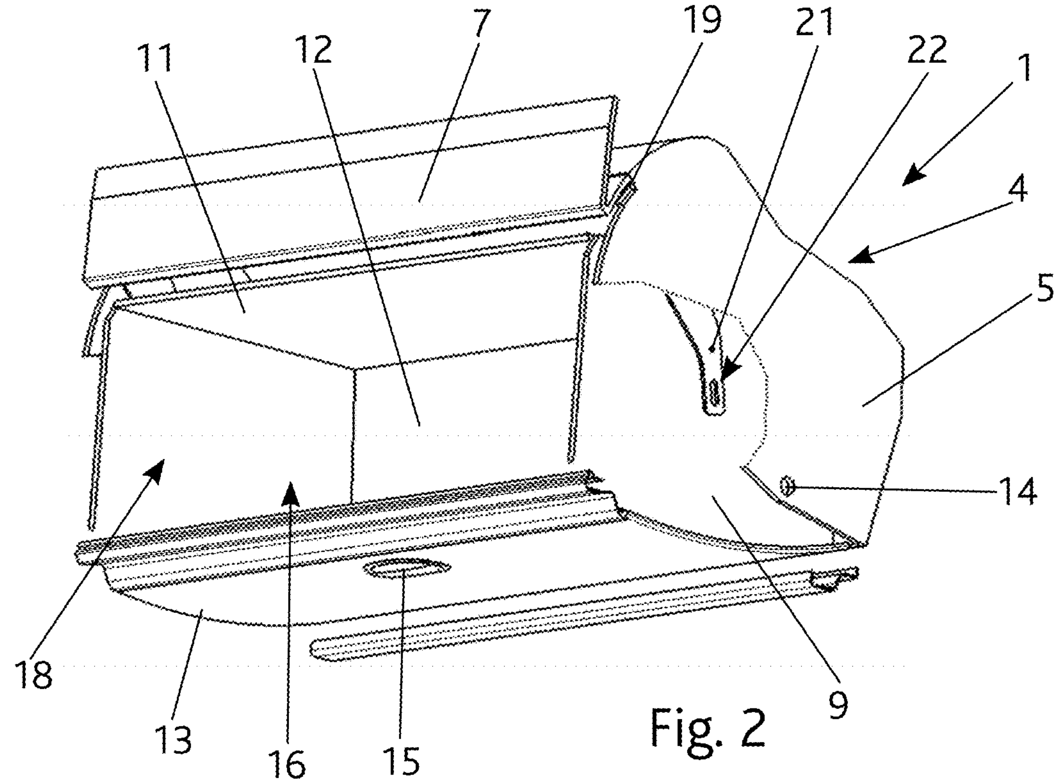
Figure 4:
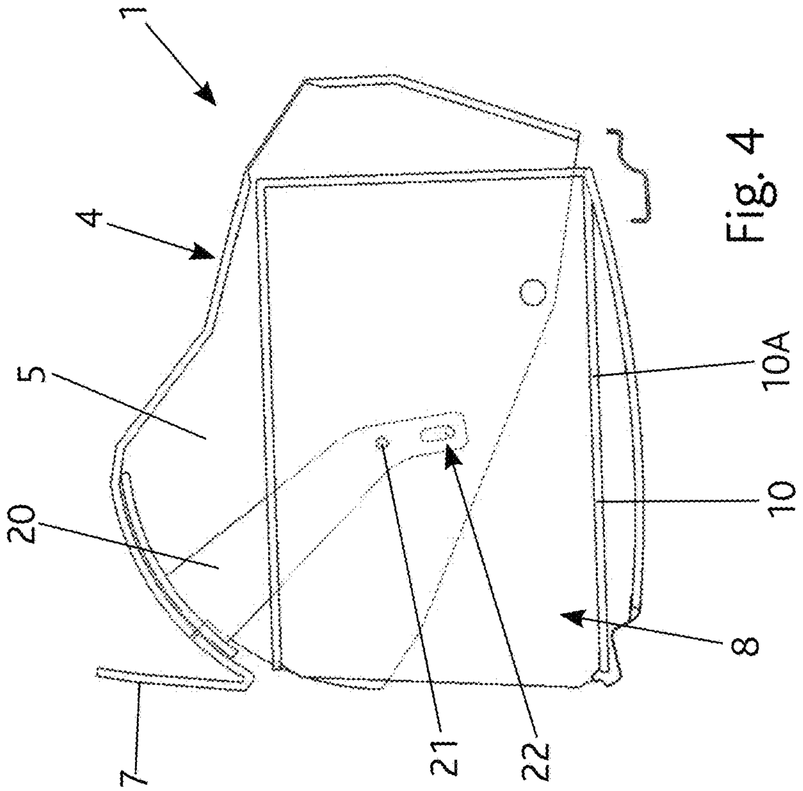
Figure 3:
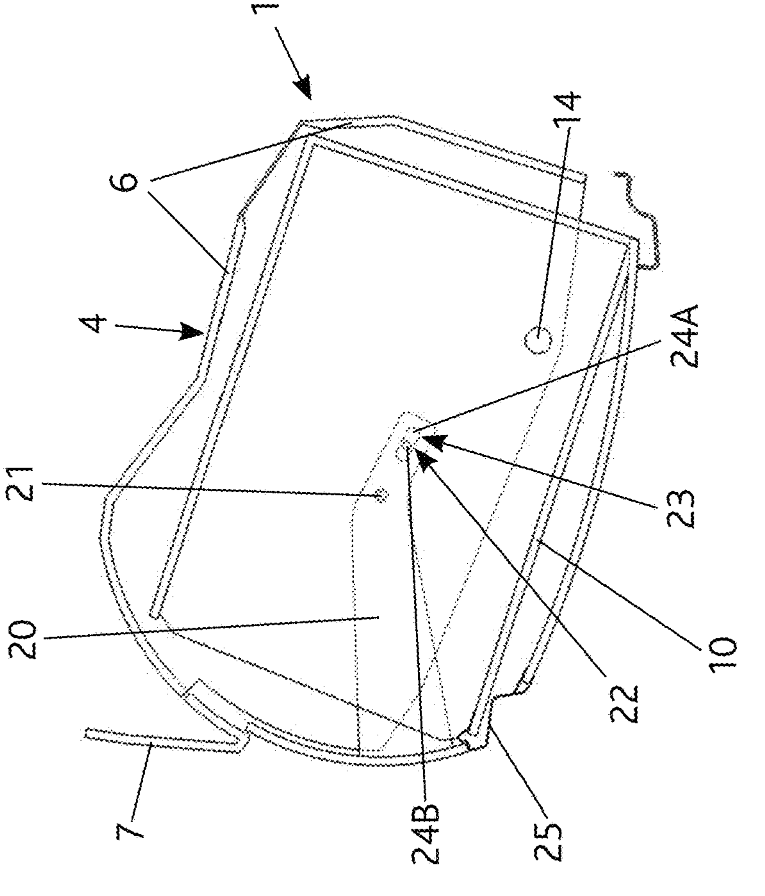

As can be seen from a comparison of FIG. 1 and FIG. 2, the bucket 8 is pivoted by a pivot angle selected from a range of 10° to 30°, in particular from 15° to 25°, during lowering from the storage position to the loading position. In the loading position, a flat mounting surface 10A is arranged on the top of the bottom 10 of the bucket 8 at an angle selected from a range of +5° to −15°, in particular from +0° to −10°, to the horizontal (i.e., in the mounted state of use to the bottom of the aircraft cabin).

As can be seen in particular from FIGS. 1 and 2, the bucket 8 comprises an engagement point with which the bucket 8 is lifted by the user from the loading position into the storage position. In the design shown, a handle strip with a handle strip surface 25 is provided as an engagement point, which extends at the front in the lower area of the bucket 8 in the longitudinal direction of the aircraft fuselage. In the loading position of the bucket 8, a tangent of the circular arc-shaped movement path of the bucket with respect to the hinge 14, passing through the handle strip surface 25, runs at an angle of 60° to 120°, preferably at an angle of 80° to 100°, to the handle strip surface 25.

FIG. 5 and FIG. 6 show a variant of the overhead luggage compartment shown in FIGS. 1 to 4.

In the variant of FIGS. 1 to 4, the radius of curvature of the cover element 19 corresponds substantially to the radius of movement of the cover element 19. In contrast, in the variant of FIGS. 5 and 6, the radius of curvature of the cover element 19 differs from the radius of movement of the cover element 19.

Figure 8:
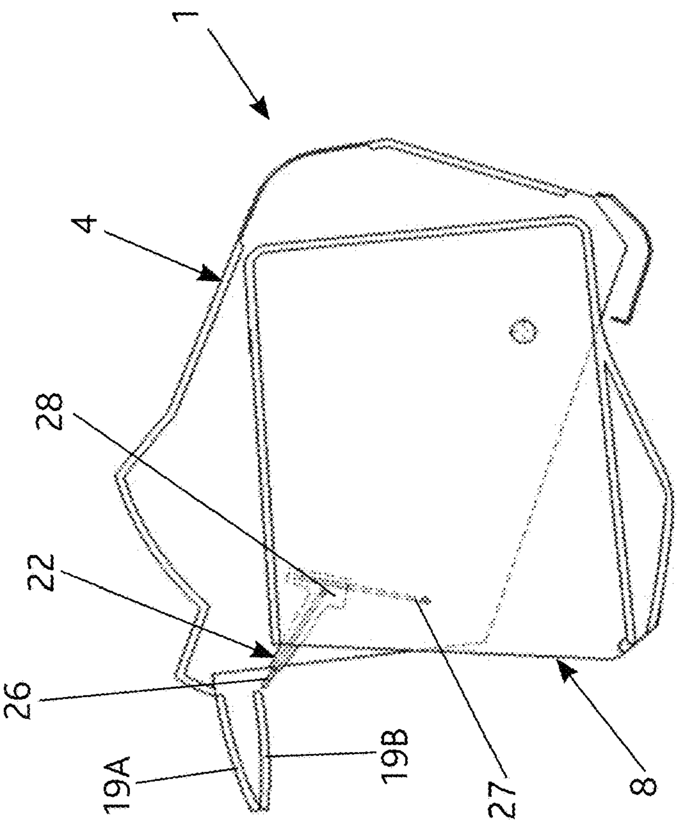
FIG. 7 and FIG. 8 show another embodiment of the overhead luggage compartment.
Figure 7:
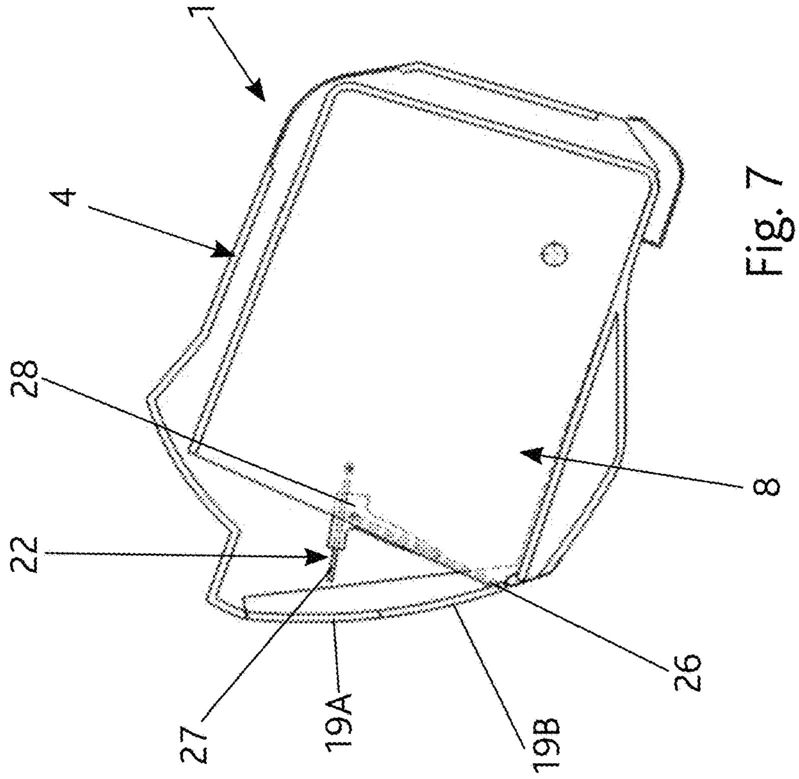

FIGS. 7 and 8 show a further exemplary embodiment, only the differences from the exemplary embodiment of FIGS. 1 to 4 being explained below.

In the exemplary embodiment of FIGS. 7 and 8, the cover element 19 is suspended at the front on the luggage compartment housing 4. In this embodiment, the cover element 19 consists of a first covering panel element 19A and a second covering panel element 19B. The lower end of the first covering panel element 19A is articulated to the upper end of the second covering panel element 19B. In the closing position (cf. FIG. 7), the first 19A and the second covering panel element 19B are in an unfolded condition, in which the first 19A and the second covering panel element 19B are arranged standing one above the other. In the opening position (cf. FIG. 8), the first 19A and the second covering panel element 19B are in a folded condition, wherein the first 19A and the second covering panel element 19A are arranged horizontally, i.e. with mutually facing main extension planes.

In the exemplary embodiment of FIG. 7 and FIG. 8, a coupling device 22 is also provided, which, however, is designed differently than in the exemplary embodiments of FIG. 1 to FIG. 4 or FIG. 5 and FIG. 6. According to FIG. 7 and FIG. 8, the coupling device 22 comprises a first coupling element 26 and a second coupling element 27, each of which is linearly movable in a link 28. The first coupling element 26 is articulated to the cover element 19, in this case to the lower end of the second covering panel element 19B. The second coupling element 27 is articulated to the bucket 8, in this case to the side wall 8 of the bucket 8.

Figure 9:
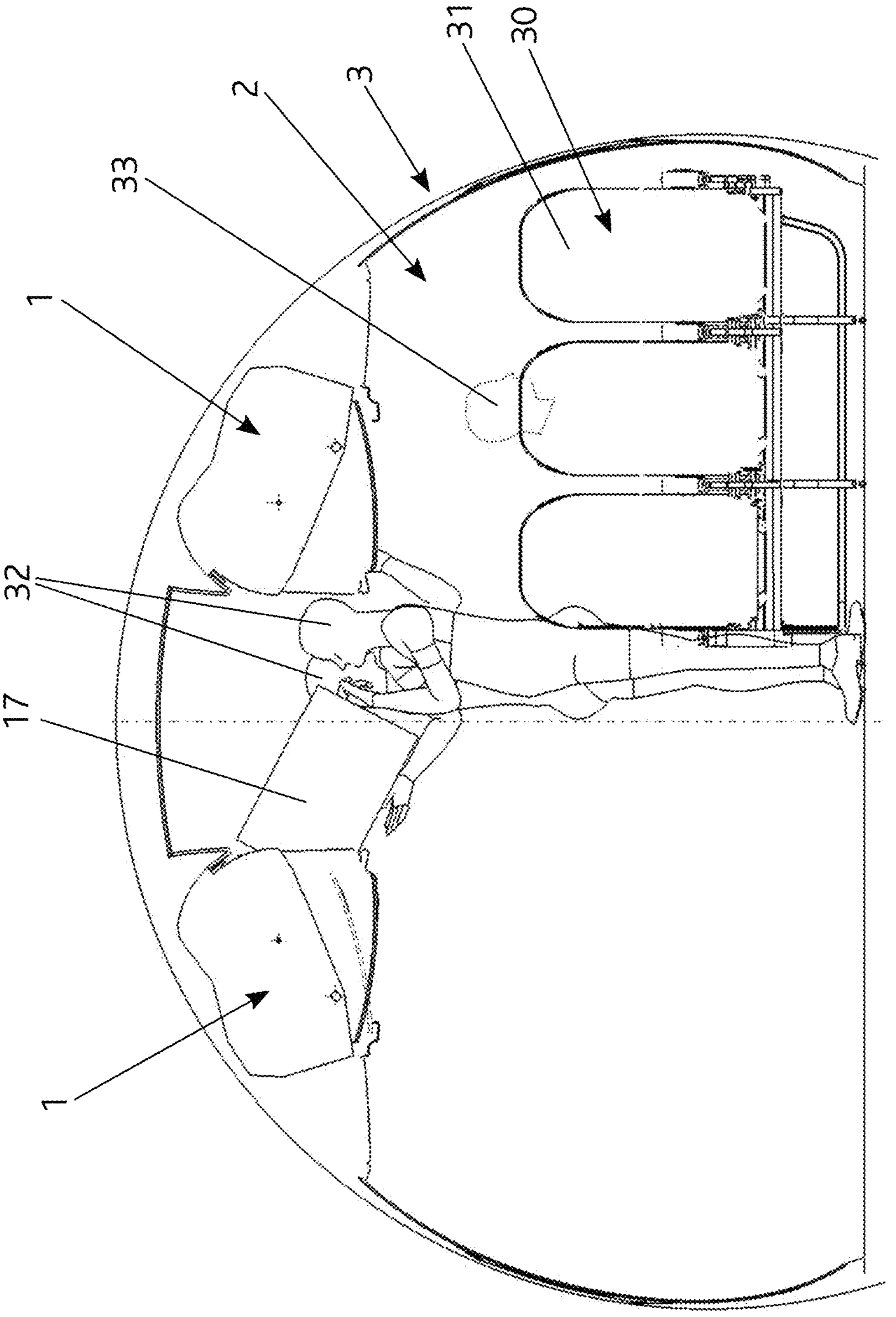
FIG. 9 schematically shows the storage of pieces of luggage in overhead luggage compartments according to the invention.

FIG. 9 symbolically shows the aircraft 2 during loading of luggage compartments 1 in one of the previously described embodiments. The luggage compartment 1 is located above a row of seats 30 with several seats 31. While one of the passengers 32 is still storing their pieces of luggage 17 in the luggage compartments 1, another passenger 33 is taking his place underneath the luggage compartment 1. The design of the luggage compartment 1 according to the invention makes do with a comparatively small lowering of the luggage compartment 1, as a result of which more space is created above the seats for the passage of the passengers.

The invention claimed is:

1. A luggage compartment for an aircraft, comprising:

a luggage compartment housing, a bucket with a bottom and two side walls for receiving a piece of luggage, a hinge defining a pivot axis between the luggage compartment housing and the bucket, wherein the bucket can be lowered by pivoting about the hinge from a raised storage position into a lowered loading position, and a cover element, which in the storage position of the bucket closes a loading opening of the bucket and in the loading position releases the loading opening of the bucket, wherein when the bucket is lowered from the storage position into the loading position, the cover element can be moved by pivoting about the hinge from a closing position closing the loading opening into an opening position releasing the loading opening.

2. The luggage compartment according to claim 1, wherein, in the loading position, the bucket is pivoted relative to the storage position by a pivot angle selected from a range of 10° to 30°.

3. The luggage compartment according to claim 1, wherein a mounting surface of the bottom of the bucket in the loading position is arranged at an angle selected from a range of +5° to −15° to the horizontal.

4. The luggage compartment according to claim 1, comprising a coupling device which acts between the bucket and the cover element and is designed to move the cover element from the closing position into the opening position by lowering the bucket from the storage position into the loading position.

5. The luggage compartment according to claim 4, wherein the coupling device comprises a slotted guide, with which the lowering of the bucket from the storage position into the loading position is transmitted into the movement of the cover element from the closing position into the opening position.

6. The luggage compartment according to claim 5, wherein the slotted guide comprises a link slot and a link block.

7. The luggage compartment according to claim 1, wherein the cover element is fastened to a pivot arm.

8. The luggage compartment according to claim 1, wherein the cover element is guided from the closing position into the opening position along a circular arc-shaped movement path.

9. The luggage compartment according to claim 1, wherein the cover element is guided adjacent to an inner side of a front part of the luggage compartment housing during the transition from the closing position to the opening position.

10. The luggage compartment according to claim 1, in that wherein, in the opening position, the cover element is arranged at least partially above a lower edge of a front part of the luggage compartment housing.

11. The luggage compartment according to claim 1, wherein the cover element is mounted on a front part of the luggage compartment housing.

12. The luggage compartment according to claim 1, wherein the cover element comprises a first covering panel element and a second covering panel element, wherein the first and the second covering panel elements are connected to one another in an articulated manner, wherein the first and the second covering panel elements are arranged in an unfolded condition in the closing position and in a folded condition in the opening position.

13. The luggage compartment according to claim 8, wherein the bucket comprises an engagement point with an engagement surface for a user for pivoting the bucket from the loading position into the storage position, wherein in the loading position of the bucket, a tangent of the circular arc-shaped movement path of the bucket through the engagement surface is arranged at an angle of 60° to 120° to the engagement surface.

14. An aircraft with the luggage compartment according to claim 1.

15. The luggage compartment according to claim 1, wherein when the bucket is lowered from the storage position into the loading position, the cover element is lifted by pivoting about the hinge from the closing position into the opening position.

16. The luggage compartment according to claim 7, wherein the pivot arm is pivotably mounted on a side part of the luggage compartment housing.

17. The luggage compartment according to claim 10, wherein, in the opening position, the cover element is arranged substantially completely above the lower edge of the front part of the luggage compartment housing.

18. The luggage compartment according to claim 11, wherein the cover element is suspended on the front part of the luggage compartment housing.

19. The luggage compartment according to claim 13, wherein the engagement point with an engagement surface for a user includes a handle strip which extends along the bucket and has a handle strip surface.

20. The aircraft according to claim 14, wherein the luggage compartment is an overhead luggage compartment.

* * * * *